United States Patent [19]

Kaide et al.

[11] 4,255,318

[45] Mar. 10, 1981

[54] FIRE-RETARDANT PUTTY-LIKE COMPOSITIONS

[75] Inventors: Tamotsu Kaide; Toshikazu Gozen, both of Takarazuka; Jinichi Taniguchi, Takatsuki; Yutaka Ohta, Amagasaki, all of Japan

[73] Assignee: Dainichi-Nippon Cables, Ltd., Amagasaki, Japan

[21] Appl. No.: 58,334

[22] Filed: Jul. 17, 1979

[51] Int. Cl.³ .................................................. C08K 7/14
[52] U.S. Cl. .............................. 260/42.18; 260/42.34; 260/DIG. 24
[58] Field of Search ............ 260/42.18, 42.34, 23.7 H, 260/31.8 DR, 30.6 R, DIG. 24

[56] References Cited

U.S. PATENT DOCUMENTS

| | | | |
|---|---|---|---|
| 3,843,592 | 10/1974 | Perkins | 260/42.34 |
| 4,138,537 | 2/1979 | Dembowski et al. | 260/42.34 |

*Primary Examiner*—Lewis T. Jacobs

*Attorney, Agent, or Firm*—Pollock, Vande Sande & Priddy

[57] ABSTRACT

A composition for filling the spaces in bores penetrating walls and floors of buildings and having electric wires and cables extending therethrough or for filling the clearances at the joints of interior finishing materials of buildings. The composition comprises (a) 100 parts by weight of a curable polychloroprene in a liquid state at room temperature, (b) about 200 to about 700 parts by weight of a hydrated metallic oxide, and (c) about 20 to about 100 parts by weight of a heat-resistant fibrous material. The components (b) and (c) are contained in a combined amount of at least about 250 parts by weight per 100 parts by weight of the component (a). The composition will not soften, sag or drip in molten drops even when subjected to the high-temperature conditions of a fire, and gives a tough residual product retaining the original shape when burned and ashed, effectively preventing the spread of fire and assuring outstanding smoketightness.

25 Claims, No Drawings

4,255,318

FIRE-RETARDANT PUTTY-LIKE COMPOSITIONS

BACKGROUND OF THE INVENTION

This invention relates to fire-retardant putty-like compositions for filling the spaces in bores penetrating walls and floors of buildings and having electric wires and cables extending therethrough or for filling the clearances at the joints of interior finishing materials of buildings.

Various fire-retardant putty-like compositions of this type have heretofore been proposed. These compositions must have such properties that when a fire breaks out in a section of a building, the composition, exposed to a high temperature in the initial stage of the fire, will not sag due to softening and deformation per se or fall in molten drops, without permitting flames and smoke to spread to an adjacent section through a space which would otherwise be formed. Additionally the putty-like composition must remain in shape free of large deformation or dripping even if heat and wind pressure build up in the fire section due to fierce flames and heavy smoke amidst of the fire. It is further desired that even when the composition has been burned out, carbonized and eventually ashed, the residual ashed product has toughness without becoming brittle and falling, thus completely preventing the spread of fire to the adjacent section to minimize the damage.

Published Unexamined Japanese Patent Application No. 122895/1977 discloses a composition containing soybean oil as a binder and consisting mainly of an inorganic filler such as hydrated alumina and an inorganic fiber such as asbestos. The composition softens and deforms with a rise in temperature in the event of a fire, is not satisfactory in non-sagging properties and fails to fully prevent the spread of fire. Published Unexamined Japanese Patent Applications Nos. 34150/1978 and 125552/1977 disclose compositions containing liquid chloroprene as a binder and consisting predominently of an inorganic filler such as hydrated alumina, and glass fiber or like inorganic fiber or an organic fiber. Although having good non-sagging or non-dripping properties, the compositions burn when subjected to a fierce fire involving a heavy smoke and high wind pressure, giving a brittle ash residue which cracks and progressively breaks down into falling fragments to form a hole where the composition has been applied. Thus the compositions are unable to completely prevent the spread of fire.

While the putty-like compositions of this invention comprise known materials which are individually employed in the prior art references mentioned above, the materials are used in specified combination in specific proportions as will be described later, so that the present compositions exhibit outstanding performance, have excellent non-sagging and non-dripping properties under the sever conditions of fires and retain the original shape, or a shape near to the original even when burned to an ashed state because the ash residue has exceedingly high toughness which has never been afforded by the conventional putty-like compositions. The present compositions therefore assure outstanding smoketightness and effectively prevent the spread of fire. Needless to say, the compositions are easy to handle especially for filling spaces.

SUMMARY OF THE INVENTION

The main object of the present invention is to overcome the foregoing drawbacks of the conventional compositions and to provide novel putty-like compositions which have suitable plasticity, and airtightness for filling various spaces, joint clearances, etc. in buildings and which retain non-sagging and non-dripping properties even when subjected to severe conditions in the event of a fire, the present composition, when burned and ashed, giving a residual product having high toughness and retaining the original shape or a shape near to the original.

The fire-retardant putty-like compositions of this invention comprise (a) 100 parts by weight of a curable polychloroprene in a liquid state at room temperature, (b) about 200 to about 700 parts by weight of a hydrated metallic oxide, and (c) about 20 to about 100 parts by weight of a heat-resistant fibrous material, the compositions containing the hydrated metallic oxide (b) and the heat-resistant fibrous material (c) in a combined amount of at least about 250 parts by weight per 100 parts by weight of the polychloroprene (a).

DETAILED DESCRIPTION OF THE INVENTION

The polychloroprene in a liquid state at room temperature and serving as the component (a) of the putty-like compositions of the invention is used as a binder, and are curable at room temperature or higher temperatures.

Examples of such polychloroprenes are chloroprene homopolymer; copolymers of chloroprene and at least one monomer which is copolymerizable with chloroprene, such as styrene, methacrylic acid, methyl methacrylate, acrylonitrile or like vinyl compound, or 1,3-butadiene, isoprene, 2,3-dichloro-1,3-butadiene or like conjugated diene; and chloroprene-sulfur copolymer. Exemplary of useful end groups of these polychloroprenes are active halogen group, hydroxyl group, carboxyl group, thiol group, alkylxanthate group, or like groups geing able to cause condensation, addition reaction, etc.

The liquid polychloroprenes to be used in the present invention are usually used together with a curing agent described below, although the agent is not necessarily needed in the case where such a polychloroprene, for example, those having alkylxanthate end groups, carboxyl end group etc., is used which is curable at high temperatures without the curing agent. Examples of useful curing agents are lead peroxide and like metallic peroxides; tolylenediisocyanate and like diisocyanates; tetraethylenepentamine, aminoethylpiperadine, 4-aminomethylpiperidine, N-aminopropylpipecolin, N,N-dimethylpropane-1,3-diamine, methyliminobis-propylamine, ketimine, methacrylate-amin adduct, epoxylamine adduct and like amines; t-butylhydro peroxide, 2,4-dichlorodibenzoyl peroxide, dicumyl peroxide and like organic peroxides; zinc oxide, magnesium oxide, lead monoxide, red lead and like metallic oxides; sulfur; n-butylaldehydeaniline and like aldehydeamines; N,N'-diphenylthiourea, N,N'-diethylthiourea and like thioureas; di-orthotolylguanidine, di-orthotolylguanidine salt of dicatechol borate and like guanidines; sodium dimethyldithiocarbamate, sodium diethyldithiocarbamate and like dithiocarbamates; and zinc butylxanthate and like xanthates. A suitable, if necessary, two or more curing agent selected from the above are used according to the end group of polychloroprene.

These curing agents are used in an amount of about 0.5 to about 20 parts by weight per 100 parts by weight of the liquid polychloroprene.

Preferable among the liquid polychloroprenes exemplified above are those having a viscosity of about 5,000 to about 500,000 cps, especially about 10,000 to about 300,000 cps, at room temperature (25° C.). With respect to the end group, preferable are those having an alkylxanthate group in which the alkyl has 2 to about 10 carbon atoms such as ethyl, propyl, butyl etc. It is also desirable to use those having a hydroxyl end group conjointly with a diisocyanate such as tolylenediisocyanate serving as a curing agent. It is more desirable to use a liquid polychloroprene having at least one kind of the alkylxanthate end groups as admixed with a liquid polychloroprene having at least one hydroxyl end group in an amount of up to about 100 parts by weight per 100 parts by weight of the former.

According to this invention, the liquid polychloroprenes given above are usable, with or without any of the curing agents mentioned above when so desired. Preferable polychloroprenes are those satisfying curing properties as determined by the following test method.

Test method: 100 parts by weight of the component (a) is admixed with 400 parts by weight of $Al_2O_3 \cdot 3H_2O$ (mean perticle size: 3.5 μm) and 30 parts by weight of glass fiber (mean diameter: 13 μm, mean length; 6 mm) and the mixture is kneaded into a putty-like composition, which is then heated at 250° C. for 30 minutes. The component (a) is acceptable when the composition, after the heating, is up to about 1, preferably up to about 0.5 in cone penetration value evaluated in accordance with JIS A 5752-1966 (mm/150 g, 5 sec, at 20° C.).

The hydrated metallic oxide (or hydroxide of metal) serving as the component (b) of the present compositions is in the form of a fire-retardant or nonflammable powder having a mean particle size of up to about 100 μm, prefereably up to about 80 μm, and having a heat loss of at least about 8% by weight, preferably, at least about 20% by weight obtained by the following formula:

$$\text{heat loss } (O/O) = A - B/A \times 100$$

where
A: initial weight of sample
B: constant weight of sample after heating at a temperature of 400 ±20° C.

Examples of useful hydrated metallic oxides are hydrated aluminas, represented by the formular $Al_2O_3 \cdot nH_2O$ (n being 0.5–about 6), such as $Al_2O_3 \cdot \frac{1}{2}H_2O$, $Al_2O_3 \cdot H_2O$, $Al_2O_3 \cdot 2H_2O$, $Al_2O_3 \cdot 3H_2O(Al(OH)_3)$, etc. and hydrated magnesias such as $Mg(OH)_2$, etc.

It is preferably to use a hydrated metallic oxide comprising at least two portions which differ in particle size, or to conjointly use at least two kinds of hydrated metallic oxides which differ in particle size. Stated more specifically, the component (b) comprises at least two portions one of which has a mean particle size of about 10 to about 100 μm, preferably about 10 to about 80 μm, the other portion being up to about 10 μm in mean particle size.

The hydrated metallic oxides serving as the component (b) are used in an amount of about 200 to about 700 parts by weight, preferably about 250 to about 450 parts by weight, per 100 parts by weight of the component (a). With less than about 200 parts by weight of the component (b) present, the putty-like composition has greatly increased flowability, is prone to deformation when applied even at room temperature, is liable to soften and drop when subjected to the heat of fires and gives a brittle residue when ashed. With use of more than about 700 parts by weight of the component (b), the ingredients (a), (b) and (c) will have reduced compatibility when they are mixed, while the resulting composition is not satisfactorily applicable to spaces, bores or the like and affords low airtightness even at room temperature if filled in place.

When the component (b) comprises at least two portions of different particle sizes, the portion up to about 10 μm in mean particle size is used in an amount of about 10 to about 500 parts by weight per 100 parts by weight of the other portion with a mean particle size of 10 to about 100 μm.

According to this invention it is advantageous to use the component (b) in combination with particles, smaller than about 10 μm, of at least one of clay, zinc borate, bentonite, talc, diatomaceous earth, calcium carbonate and mica in an amount of up to about 80% by weight, preferably up to about 50% by weight, based on the component (b). The composition will then afford a residual product of enhanced toughness when ashed. Among the above-mentioned materials, clay, zinc borate and bentonite are especially advantageous to use.

The heat-resistant fibrous materials useful as the component (c) of the present compositions are inorganic fibers, and organic polymeric fibers which will not thermally deform at temperatures of lower than about 250° C. Such fibers are up to about 100 μm, preferably about 0.5 to about 50 μm, in mean diameter and up to about 30 mm, preferably about 1 to about 20 mm, in mean length.

Examples of useful inorganic fibers are glass fiber, asbestos fiber, carbon fiber, etc. Examples of suitable organic polymeric fibers are phenolic resin fibers, polyimide fiber, polyamide-imide fiber, etc. Among these fibers, glass fiber and asbestos fiber are preferable. A mixture of glass fiber and asbestos fiber is more preferable.

The heat-resistant fibers serving as the component (c) are used in an amount of about 20 to about 100 parts by weight, preferably about 20 to about 60 parts by weight, per 100 parts by weight of the component (a). With less than about 20 parts by weight of the component (c), the putty-like composition, when exposed to the high temperature of a fire, is liable to soften and sag, and also fails to give a tough ashed product. If used in an amount of more than about 100 parts by weight, the component (c) will be less compatible with the other ingredients when formulated into a putty-like composition, while the composition is not satisfactorily applicable and provides impaired airtightness at room temperature if used.

When the heat-resistant fibrous material (c) comprises a mixture of glass fiber and asbestos fiber, it is suitable to use about 10 to about 300 parts by weight of asbestos fiber per 100 parts by weight of glass fiber.

As described above, the fire-retardant putty-like compositions of the present invention consist essentially of 100 parts by weight of the component (a), about 200 to about 700 parts by weight of the component (b) and about 20 to about 100 parts by weight of the component (c). It is also critical that the compositions contain the component (b) and the component (c) in a combined amount of at least about 250 parts by weight per 100 parts by weight of the component (a). If the combined amount of the components (b) and (c) is less than about 250 parts by weight, the composition is unable to exhibit high fire retardancy and non-sagging and non-dripping properties in the event of a fire and to yield a tough ashed product.

The fire-retardant putty-like compositions of this invention, when comprising the components (a), (b) and (c) in the proportions specified above, have outstanding fire retardancy, will not sag or drip even if exposed to a high temperature and high wind pressure due to the intense flame and smoke of fires but rather gain hardness with the lapse of time, and afford a tough ashed product if burned and ashed. The present compositions are therefore exceedingly superior to any of the conventional putty-like compositions in assuring high smoke-tightness and preventing the spread of fire. Such remarkable effects are not achievable if any one of the components (a), (b) and (c) is used in a proportion outside the specified range.

The present compositions, which consist essentially of the components (a), (b) and (c), may further incorporate flame retardants, plasticizers, and silane coupling agents or titanate coupling agents, such as given below, when so desired. Flame retardants:

Suitable flame retardants are those heretofore known for use with rubbers and plastics. Examples are: (i) inorganic flame retardants such as antimony trioxide, antimony oxide, molybdenum trioxide, ammonium polyphosphate, zirconium, oxide, etc., and (ii) organic flame retardants such as chlorinated paraffin, decabromodiphenyl ether and like halogen-containing organic compounds, tris(aziridinyl)phosphine oxide, phosphonyl amide and like phosphorus-containing organic compounds, bromo cresyl phosphate, tetrakis(hydroxymethyl)phosphonium chloride and like phosphorus- and halogen-containing organic compounds, etc.

These flame retardants are useful for imparting improved flame retardancy to the putty-like composition during the rise of temperature in the initial stage of a fire. The above-mentioned flame retardants are used in an amount of up to about 100 parts by weight per 100 parts by weight of the component (a).

Plasticizers

Plasticizers usually used for polyvinylchloride are usable. Examples are diisobutyl phthalate, dioctyl phthalate and like phthalic acid derivatives, diisooctyl sebacate and like sebacic acid derivatives, tricresyl phosphate and like phosphoric acid derivatives. Other examples are process oil, linseed oil, soybean oil and like oils, liquid urethane resin, liquid epoxy resin, liquid polybutene resin and like liquid synthetic resin, etc.

Use of such plasticizers renders the resulting composition easily applicable. When the composition is used, for example, for filling the space in a bore around a cable extending through the bore and sheathed as with polyvinylchloride, the plasticizer in the sheath can be held in equilibrium with the plasticizer in the composition at room temperature and prevented from migrating into the composition. This inhibits the hardening of the cable sheath, hence desirable. The plasticizers nevertheless tend to impair the non-sagging or non-dripping properties of the composition at high temperatures, so that it is preferable to use the plasticizers in an amount of up to about 50 parts by weight, more preferably up to above 30 parts by weight, per 100 parts by weight of the component (a).

Silane coupling agents

Useful silane coupling agents are those represented by the formula $$Y(C_nH_{2n})SiX_3$$

wherein n is zero or an integer of 1 to 6, X is chlorine, alkoxy or acetoxy, and Y is chlorine, vinyl, methacryloxy, cyclic epoxy, glycidoxy, mercapto, amino, diamino or ureido, the organic groups exemplary of X and Y having about 2 to about 30 carbon atoms. Examples of such silane coupling agents are γ-chloropropyltrimethoxysilane, vinyltrichlorosilane, vinyl-tris(β-methoxy-ethoxy)silane, γ-methacryloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, ureidopropyltriethoxysilane, etc.

Titanate coupling agents

Useful titanate coupling agents are represented by one of the following formulae:

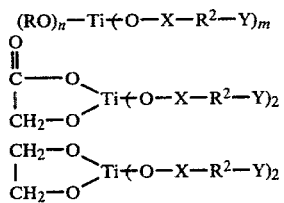

wherein RO is $C_{1-6}$ alkoxy, n is an integer of 1 or 4, m is an integer of 2 or 3, X is carboxyl, phenyl, ethylene, phosphate, pyrophosphate, phosphite or sulfonyl, $R^2$ is $C_{1-20}$ alkyl, and Y is hydrogen, allyl, vinyl or aminoimino. Examples are isopropyltriisostearoyltitanate, diisostearoyl ethylene titanate, titanium diacrylate oxyacetate, etc.

The silane coupling agents or titanate coupling agents give the component (b) or (c) improved affinity for the component (a) and are effective for preparing suitable putty-like compositions. Up to about 30 parts by weight, preferably about 2 to about 10 parts by weight, of such agents are used per 100 parts by weight of the component (a).

According to this invention, the components (a), (b) and (c) can be used conjointly with antioxidants, pigments, carbon black, stabilizers, etc. which are usually used for rubbers and plastics. Suitably these additives are used in an amount of up to about 20 parts by weight per 100 parts by weight of the component (a).

The fire-retardant putty-like compositions of this invention initially have a cone penetration value (mm/150 g, 5 sec, at 20° C.) of about 2 to about 40, preferably about 4 to about 15, as determined according to JIS A 5752-1966. When having a cone penetration value within the above-mentioned range, the putty-like compositions have suitable softness for filling various spaces, joint clearances, etc.

The fire-retardant putty-like compositions of the invention can be prepared by mixing the foregoing ingredients with rolls usually used for mixing rubbers and plastics. To effect dispersion of the ingredients, especially the heat-resistant fiber, namely the component (c), in the composition with improved uniformity, the ingredients are preferably mixed together while being subjected to high-shear friction with use of a kneader or the like.

The features of the fire-retardant putty-like compositions of this invention will be described below in greater detail with reference to examples.

EXAMPLES 1-13 AND COMPARISON EXAMPLES 1-6

The compositions listed in Table 1 were prepared with use of a 2-liter experimental kneader and tested for mixing workability, airtightness at room temperature, fire retardancy, shape retentivity against heat and toughness of ashed product by the methods to be described later. The properties of the compositions were evaluated according to the criteria given below. The results are shown in Table 2. The compositions of Examples 1 and 4, and Comparison Example 3 were filled in simulated cable bores and subjected to a flame test under conditions similar to an actual fire as will be described below to observe the burning process of the compositions. Table 3 shows the results.

The above properties were determined by the following test methods and evaluated according to the criteria given below.

Mixing workability

The ingredients of each composition in specified amounts were placed into a 2-liter test kneader equipped with agitator blades and mixed together at room temperature to 80° C. for 40 minutes. The resulting mixture was observed with the unaided eye and touched with fingertips to evaluate the homogeneity thereof according to the three criteria of: excellent, good and poor.

Airtightness

An iron pipe, 300 mm in inside diameter and 600 mm in length, was filled at its one end with the composition to a thickness of 100 mm. While exposing the outer surface of the composition layer to the atmospheric pressure at 80° C., air was forced into the pipe from the other end at pressure of 0.8 kg/cm² gauge for 5 minutes. If the leakage of air through the composition layer was not larger than 5 liters/min, the composition was evaluated as acceptable.

Fire retardancy

The oxygen index of the composition was determined in accordance with JIS K 7201-1976 to evaluate the fire retardancy based on the following criteria:
Not smaller than 80 in oxygen index: excellent
60 to less than 80 in oxygen index: good
Less than 60 in oxygen index: poor

Shape retentivity against heat

The composition was shaped into a pillar, 3 cm×3 cm×7 cm, which was then allowed to stand in its upright position within an oven at 250° C. for 30 minutes and thereafter withdrawn from the oven. The resulting variation in the height of the pillar was measured to evaluate the shape retentivity based on the variation and according to the following criteria:

| | |
|---|---|
| Less than 5% in variation | excellent |
| 5% to less than 10% in variation | good |
| Not less than 10% in variation, or overturned or cracked pillar | poor |

Toughness of ashed product

The composition was shaped into a cube, 3 cm×3 cm×3 cm, which was then heated in an electric furnace at 1,000° C. for 3 hours to a completely ashed state, thereafter withdrawn and allowed to cool. The ashed residue was checked for appearance and touched with fingertips to evaluate the toughness according to the following criteria:

| | |
|---|---|
| Uncollapsible with a strong pressing touch | excellent |
| Slightly collapsible with a strong pressing touch | good |
| Easily collapsible with a light touch | poor |

Flame test

The following flame test was conducted for the putty-like compositions of Examples 1 and 4, and Comparison Example 3 with use of bore penetrating cables simulating those in actual buildings to observe the burning process of the compositions as applied to the penetrating cable portions.

A rectangular bore, 45 cm×12 cm, was formed in the center of a concrete board, 1 m×1 m×10 cm. Ten 600 V polyvinylchloride-sheathed polyvinylchloride-insulated cables, 34 mm in sheath outside diameter and 1.6 m in length, were passed through the bore as arranged side by side at right angles to the concrete board, with equal lengths of the cables projecting from opposite sides of the board. One of the above-mentioned compositions was filled in the space within the bore around the cables to prepare a specimen. The lower side only of the specimen including the cable portions projecting therefrom was assembled into a vertical heating furnace measuring 1 m×1 m×1.5 m and was sealed off. The interior of the furnace was heated with propane gas with its flame in direct contact with the bored portion of the concrete board on its lower side. The specimen was heated for 2 hours in conformity with the heating curve (room temperature to 1,010° C., max.) provided in JIS A 1304-1975 and approximately representing the rise of temperature in actual fires. The same procedure as above was repeated with use of the other two compositions. The results are given in Table 3.

TABLE 1

| Material | Examples No. | | | | | | |
|---|---|---|---|---|---|---|---|
| | 1 | 2 | 3 | 4 | 5 | 6 | 7 |
| Polychloroprene[1] | 100 | 70 | 50 | 100 | 100 | 100 | — |
| Polychloroprene[2] | — | 30 | 50 | — | — | — | 100 |
| Polychloroprene[3] | — | — | — | — | — | — | — |
| Zinc oxide | — | — | — | — | — | — | 10 |
| Tolylenediisocyanate | — | — | — | — | — | — | 3 |

TABLE 1-continued

| Material | | 1 | 2 | 3 | 4 | 5 | 6 | 7 |
|---|---|---|---|---|---|---|---|---|
| Aluminium hydroxide | 60 μm* | 50 | 100 | 100 | 100 | 100 | 100 | 100 |
| Aluminium hydroxide | 25 μm* | 50 | 150 | 150 | 150 | 100 | 150 | 150 |
| Aluminium hydroxide | 35 μm* | 100 | 150 | — | — | 100 | — | 150 |
| Aluminium hydroxide | 10 μm* | 100 | — | — | — | — | — | — |
| Magnesium hydroxide | 10 μm* | — | — | — | — | — | 150 | — |
| Clay | 30 μm* | — | — | 150 | — | — | — | — |
| Zinc borate | 30 μm* | — | — | — | 150 | — | — | — |
| Bentonite | 10 μm* | — | — | — | — | 30 | — | — |
| Glass fiber[4] | | 30 | 20 | 15 | 30 | 30 | 30 | 30 |
| Asbestos fiber[5] | | — | 10 | 10 | 10 | 10 | 10 | 10 |
| Phenolic fiber[6] | | — | — | — | — | — | — | — |
| Dioctylphthalate | | — | 30 | 30 | 30 | — | 30 | — |
| Antimony trioxide | | — | 10 | — | — | — | 10 | — |
| Chlorinated paraffin[7] | | — | — | — | — | — | — | — |
| γ-Chloropropyltrimethoxysilane | | — | — | 10 | — | — | 10 | — |

| | | Examples No. | | | | | |
|---|---|---|---|---|---|---|---|
| Material | | 8 | 9 | 10 | 11 | 12 | 13 |
| Polychloroprene[1] | | 70 | 80 | 100 | — | 100 | 100 |
| Polychloroprene[2] | | 30 | — | — | 100 | — | — |
| Polychloroprene[3] | | — | 20 | — | — | — | — |
| Zinc oxide | | — | — | — | 10 | — | — |
| Tolylenediisocyanate | | — | — | — | 3 | — | — |
| Aluminium hydroxide | 60 μm* | 100 | 100 | — | 300 | — | — |
| Aluminium hydroxide | 25 μm* | 200 | 100 | — | — | — | — |
| Aluminium hydroxide | 35 μm* | 200 | 100 | 300 | — | — | — |
| Aluminium hydroxide | 10 μm* | — | — | — | — | — | — |
| Magnesium hydroxide | 10 μm* | — | — | — | — | 300 | 250 |
| Clay | 30 μm* | — | — | — | — | — | 100 |
| Zinc borate | 30 μm* | — | — | — | — | — | — |
| Bentonite | 10 μm* | — | — | — | — | — | — |
| Glass fiber[4] | | 20 | 30 | 30 | 60 | 30 | 30 |
| Asbestos fiber[5] | | — | — | — | — | — | — |
| Phenolic fiber[6] | | — | 10 | — | — | — | — |
| Dioctylphthalate | | 30 | — | — | — | — | — |
| Antimony trioxide | | — | 10 | — | — | — | — |
| Chlorinated paraffin[7] | | — | 30 | — | — | — | — |
| γ-Chloropropyltrimethoxysilane | | 10 | — | — | — | — | — |

| | | Comparison Examples No. | | | | | |
|---|---|---|---|---|---|---|---|
| Material | | 1 | 2 | 3 | 4 | 5 | 6 |
| Polychloroprene[1] | | 100 | 100 | 100 | — | 100 | — |
| Polychloroprene[2] | | — | — | — | 100 | — | 100 |
| Polychloroprene[3] | | — | — | — | — | — | — |
| Zinc oxide | | — | — | — | 10 | — | — |
| Tolylendiisocyanate | | — | — | — | 3 | — | — |
| Aluminium hydroxide | 60 μm* | 60 | 200 | 100 | 100 | 50 | 100 |
| Aluminium hydroxide | 25 μm* | — | 300 | 100 | 150 | 100 | 150 |
| Aluminium hydroxide | 35 μm* | 130 | 300 | 100 | 50 | 50 | 150 |
| Aluminium hydroxide | 10 μm* | — | — | 100 | — | — | — |
| Magnesium hydroxide | 10 μm* | — | — | — | — | — | — |
| Clay | 30 μm* | — | — | — | — | — | — |
| Zinc borate | 30 μm* | — | — | — | — | — | — |
| Bentonite | 10 μm* | — | — | — | — | — | — |
| Glass fiber[4] | | 30 | 30 | 5 | 15 | 15 | 30 |
| Asbestos fiber[5] | | 10 | — | 5 | — | 5 | 10 |
| Phenolic fiber[6] | | — | — | — | — | — | — |
| Dioctylphthalate | | — | 30 | — | — | — | 30 |
| Antimony trioxide | | — | — | — | — | — | — |
| Chlorinated paraffin[7] | | — | — | — | — | — | — |
| γ-Chloropropyltrimethoxysilane | | — | — | — | — | — | — |

Notes for Table 1
[1]Viscosity at 25° C.; 100,000 c.p.s.,End group; Alkylxanthate group
[2]Viscosity at 25° C.; 57,000 c.p.s.,End group; Hydroxyl group
[3]Viscosity at 25° C.; 300,000 c.p.s.,End group; Carboxyl group
[4]Diameter; 13 μm, Length; 6 mm
[5]Diameter; 0.07 μm, Length; 13 mm
[6]Diameter; 14 μm, Length; 6 mm
[7]Chlorine Content; 70 w%
*Mean particle size

TABLE 2

| | Examples No. | | | | | | | | | | | | | Comparison Examples No. | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 | 6 |
| Mixing workability: | E | E | E | E | E | E | E | G | E | E | G | G | G | G | P | E | E | G | E |
| Airtightness: | A | A | A | A | A | A | A | A | A | A | A | A | A | U | U | A | A | U | A |
| Fire retardancy: | E | E | E | E | E | E | E | E | E | E | E | E | E | P | E | E | E | G | E |
| Shape retentivity against heat: | E | E | E | E | E | E | E | E | E | G | E | G | E | P | P | P | G | P | P |

TABLE 2-continued

| | Examples No. | | | | | | | | | | | | | Comparison Examples No. | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 | 6 |
| Toughness of ashed product: | E | E | E | E | E | E | E | E | E | G | G | G | E | P | P | P | P | P | P |

E: Excellent,
G: Good
P: Poor,
A: Acceptable,
U: Unacceptable,

TABLE 3

| | Burning process |
|---|---|
| Examples 1 and 4 | No smoke leaked through the bore to the upper side of the specimen outside the furnace even two hours after the start of heating. The cable sheaths on the upper side remained free of burning although slightly thermally expanded. No portion of the composition in the bore dropped. Inside the furnace, the composition was found to have been ashed as held in place without falling, and maintaining the original shape thus very effectively preventing the spread of fire. |
| Comp. Ex. 3 | One hour after the start of heating, the composition, burned and ashed on the inner side of the furnace, began to release part of the ashed product. Ashed portions thereafter dropped in an increasing amount, permitting marked outflow of smoke through the bore to the upper side. The cable sheaths burned in the vicinity of the bore on the upper side of the specimen outside the furnace. |

As will be apparent from the above examples, the fire-retardant putty-like compositions of this invention can be prepared with good mixing workability, are usable with extreme ease because of suitable softness, retain high airtightness at room temperature, will not soften, sag or drop unlike conventional compositions even when exposed to the high temperature of a fire, and give a hard, compact and tough residue even if ashed to very effectively prevent the spread of fire.

Of these outstanding properties, the present compositions are distinct from the conventional compositions in that they will not become softened and form a tough residue when burned and ashed. Thus these are remarkable features of the present invention.

What we claim is:

1. A fire-retardant putty-like composition comprising (a) 100 parts by weight of a curable polychloroprene in a liquid state at room temperature, (b) about 200 to about 700 parts by weight of a hydrated metallic oxide, and (c) about 20 to about 100 parts by weight of a heat-resistant fibrous material, the composition containing the hydrated metallic oxide (b) and the heat-resistant fibrous material (c) in a combined amount of at least about 250 parts by weight per 100 parts by weight of the polychloroprene (a).

2. A composition as defined in claim 1 wherein the hydrated metallic oxide (b) is a hydrated alumina.

3. A composition as defined in claim 1 wherein the hydrated metallic oxide (b) is a hydrated magnesia.

4. A composition as defined in claim 2 wherein the hydrated alumina comprises a portion about 10 to about 100 μm in mean particle size and another portion less than about 10 μm in mean particle size in an amount of about 10 to about 500 parts by weight per 100 parts by weight of the former portion.

5. A composition as defined in any one of claims 1 to 4 further comprising at least one material less than about 10 μm in mean particle size and selected from the group consisting of clay, zinc borate, bentonite, talc, diatomaceous earth, calcium carbonate, mica and mixtures thereof in an amount of up to about 80% by weight based on the component (b).

6. A composition as defined in any one of claims 1 to 4 wherein the heat-resistant fibrous material (c) comprises at least one fiber selected from the group consisting of glass fiber asbestos fiber and mixtures thereof.

7. A composition as defined in claim 6 wherein the heat-resistant fibrous material (c) comprises glass fiber and asbestos fiber in an amount of about 10 to about 300 parts by weight per 100 parts by weight of the glass fiber.

8. A composition as defined in any one of claims 1 to 4 wherein the liquid polychloroprene (a) has a viscosity of about 5,000 to about 500,000 at room temperature and an alkylxanthate end group in which the alkyl has 2 to about 10 carbon atoms.

9. A composition as defined in any one of claims 1 to 4 wherein the liquid polychloroprene (a) has a viscosity of about 5,000 to about 500,000 at room temperature and comprises a mixture of a polychloroprene having an alkylxanthate end group in which the alkyl has 2 to about 10 carbon atoms and a polychloroprene having a hydroxyl end group.

10. A composition as defined in any one of claims 1 to 4 wherein the liquid polychloroprene (a) has a viscosity of about 5,000 to about 500,000 at room temperature and a hydroxyl end group and contains about 0.5 to about 20 parts by weight of a curing agent per 100 parts by weight of the polychloroprene.

11. A composition as defined in any one of claims 1 to 4 further comprising up to about 100 parts by weight of a flame retardant per 100 parts by weight of the component (a).

12. A composition as defined in any one of claims 1 to 4 further comprising up to about 50 parts by weight of a plasticizer per 100 parts by weight of the component (a).

13. A composition as defined in any one of claims 1 to 4 further comprising up to about 30 parts by weight of a silane coupling agent or a titanate coupling agent per 100 parts by weight of the component (a).

14. A composition as defined in any one of claims 1 to 4 which has a cone penetration value (mm/150 g, 5 sec, at 20° C.) of about 2 to about 40 as determined according to JIS A 5752-1966.

15. A composition as defined in claim 5 wherein the heat-resistant fibrous material (c) comprises at least one fiber selected from the group consisting of glass fiber, asbestos fiber, and mixtures thereof.

16. A composition as defined in claim 15 wherein the heat-resistant fibrous material (c) comprises glass fiber and asbestos fiber in an amount of about 10 to about 300 parts by weight per 100 parts by weight of the glass fiber.

17. A composition as defined in claim 5 wherein the liquid polychloroprene (a) has a viscosity of about 5,000 to about 500,000 at room temperature and an alkylxanthate end group in which the alkyl has 2 to about 10 carbon atoms.

18. A composition as defined in claim 6 wherein the liquid polychloroprene (a) has a viscosity of about 5,000 to about 500,000 at room temperature and an alkylxanthate end group in which the alkyl has 2 to about 10 carbon atoms.

19. A composition as defined in claim 7 wherein the liquid polychloroprene (a) has a viscosity of about 5,000 to about 500,000 at room temperature and an alkylxanthate end group in which the alkyl has 2 to about 10 carbon atoms.

20. A composition as defined in claim 5 wherein the liquid polychloroprene (a) has a viscosity of about 5,000 to about 500,000 at room temperature and comprises a mixture of a polychloroprene having an alkylxanthate end group in which the alkyl has 2 to about 10 carbon atoms and a polychloroprene having a hydroxyl end group.

21. A composition as defined in claim 6 wherein the liquid polychloroprene (a) has a viscosity of about 5,000 to about 500,000 at room temperature and comprises a mixture of a polychloroprene having an alkylxanthate end group in which the alkyl has 2 to about 10 carbon atoms and a polychloroprene having a hydroxyl end group.

22. A composition as defined in claim 7 wherein the liquid polychloroprene (a) has a viscosity of about 5,000 to about 500,000 at room temperature and comprises a mixture of a polychloroprene having an alkylxanthate end group in which the alkyl has 2 to about 10 carbon atoms and a polychloroprene having a hydroxyl end group.

23. A composition as defined in claim 5 wherein the liquid polychloroprene (a) has a viscosity of about 5,000 to about 500,000 at room temperature and a hydroxyl end group and contains about 0.5 to about 20 parts by weight of a curing agent per 100 parts by weight of the polychloroprene.

24. A composition as defined in claim 6 wherein the liquid polychloroprene (a) has a viscosity of about 5,000 to about 500,000 at room temperature and a hydroxyl end group and contains about 0.5 to about 20 parts by weight of a curing agent per 100 parts by weight of the polychloroprene.

25. A composition as defined in claim 7 wherein the liquid polychloroprene (a) has a viscosity of about 5,000 to about 500,000 at room temperature and a hydroxyl end group and contains about 0.5 to about 20 parts by weight of a curing agent per 100 parts by weight of the polychloroprene.

* * * * *